US008362418B2

(12) United States Patent
Xu et al.

(10) Patent No.: US 8,362,418 B2
(45) Date of Patent: Jan. 29, 2013

(54) NON-DESTRUCTIVE, HIGH ORDER HARMONIC ION MOTION IMAGE CURRENT DETECTION

(75) Inventors: Wei Xu, West Lafayette, IN (US); William Chappell, Lafayette, IN (US); Zheng Ouyang, West Lafayette, IN (US); Robert Graham Cooks, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 180 days.

(21) Appl. No.: 12/990,688

(22) PCT Filed: May 29, 2009

(86) PCT No.: PCT/US2009/045649
§ 371 (c)(1),
(2), (4) Date: Dec. 10, 2010

(87) PCT Pub. No.: WO2009/146418
PCT Pub. Date: Dec. 3, 2009

(65) Prior Publication Data

US 2011/0108725 A1 May 12, 2011

Related U.S. Application Data

(60) Provisional application No. 61/057,494, filed on May 30, 2008.

(51) Int. Cl.
*B01D 59/44* (2006.01)

(52) U.S. Cl. ........................ 250/283; 250/281; 250/282

(58) Field of Classification Search .......... 250/281–284, 250/290–293
See application file for complete search history.

(56) References Cited

U.S. PATENT DOCUMENTS 4,755,670 A * 7/1988 Syka et al. .................... 250/292
6,452,168 B1 * 9/2002 McLuckey et al. ........... 250/292

OTHER PUBLICATIONS

International Preliminary Report on Patentability in corresponding PCT application No. PCT/US2009/045649, mailed Dec. 9, 2010, 7 pages.

* cited by examiner

*Primary Examiner* — Michael Maskell
(74) *Attorney, Agent, or Firm* — Adam M. Schoen; Brown Rudnick LLP

(57) ABSTRACT

The invention herein generally relates to non-destructive, high order harmonic ion motion image current detection. In certain embodiments, ion motion corresponding to high order harmonic frequencies, instead of the secular frequencies, is detected using image current detection with a constant excitation applied to the waveform signal.

16 Claims, 4 Drawing Sheets

$$z(t)=\begin{pmatrix} K_1 e^{-\frac{c}{2}t}\cos\left(\sqrt{\omega_0^2-\frac{c^2}{4}}\,t\right)+\dfrac{K_2-\frac{c}{2}K_1}{\sqrt{\omega_0^2-\frac{c^2}{4}}}e^{-\frac{c}{2}t}\sin\left(\sqrt{\omega_0^2-\frac{c^2}{4}}\,t\right) \\ +K_3\cos(\omega_s t)+\dfrac{K_4}{\omega_s}\sin(\omega_s t) \\ +z(0)e^{-\frac{c}{2}t}\cos\left(\sqrt{\omega_0^2-\frac{c^2}{4}}\,t\right)+\dfrac{z'(0)+\frac{c}{2}z(0)}{\sqrt{\omega_0^2-\frac{c^2}{4}}}e^{-\frac{c}{2}t}\sin\left(\sqrt{\omega_0^2-\frac{c^2}{4}}\,t\right) \end{pmatrix}\times\left(1-q_z/2\times\cos(\omega_{rf}t)+O(h)\right)$$

Equation (3)

where the applied AC signal is in the $z$ direction and the $z(t)$ is the ion motion in $z$ direction.

$K_1=-K_3=\dfrac{f(\omega_s^2-\omega_0^2)}{(\omega_s^2-\omega_0^2)^2+c^2\omega_s^2}$, $K_2=-\dfrac{\omega_0^2}{\omega_s^2}K_4=-\dfrac{cf\omega_0^2}{(\omega_s^2-\omega_0^2)^2+c^2\omega_s^2}$, with $\omega_s$, $\omega_0$ and $\omega_{rf}$ represent the applied AC frequency, ion secular frequency and applied RF frequency respectively; $f$ is a function of the applied AC signal strength, ion trap dimension and the ion mass charge ratio; $O(h)$ represents the omitted high order terms.

FIG. 4

NON-DESTRUCTIVE, HIGH ORDER HARMONIC ION MOTION IMAGE CURRENT DETECTION

RELATED APPLICATION

This application is a national phase application and claims the benefit of PCT/US2009/045649, filed May 29, 2009, which is related to and claims the benefit of U.S. provisional patent application Ser. No. 61/057,494, filed May 30, 2008, the contents of each of which are incorporated by reference herein in their entirety for all purposes.

GOVERNMENT SUPPORT

The U.S. Government has a paid-up license in this invention and the right in limited circumstances to require the patent owner to license others on reasonable terms as provided for by the terms of Grant Number 0528948 awarded by National Science Foundation.

TECHNICAL FIELD

This application relates to systems and methods for non-destructive, high order harmonic ion motion image current detection.

BACKGROUND

Mass selective detection of ions in an ion trap is an important step of mass analysis in an ion trap mass spectrometry system. The motion of the ions trapped in an ion trap is approximately governed by the following equation:

$$a_z = -2a_r = \frac{-16zU}{m\omega_{rf}^2(r_0^2 + 2z_0^2)} \qquad \text{Equation 1}$$

$$q_z = -2q_r = \frac{8zV}{m\omega_{rf}^2(r_0^2 + 2z_0^2)}$$

where $a_u$ and $q_u$ (u refers to ion motion in the r- and z-dimensions) are Mathieu parameters, U is the DC potential, V is the maximum RF amplitude, $\omega_{rf}$ is the frequency of the RF, $r_0$ is the internal radius of the ring electrode, and the z axis is perpendicular to the endcap electrodes. E.d. Hoffmann and V. Stroobant, *Mass Spectrometry: Principles and Applications*, Second Edition ed: John Wiley &Sons, LTD, 2002. The frequencies of the ion trajectory can be described by:

$$\omega = \left(n \pm \frac{\beta}{2}\right)\omega_{rf} \qquad \text{Equation 2}$$

$$n = 0, 1, 2 \ldots$$

and β is defined as:

$$\beta_u^2 = a_u + \cfrac{q_u}{(\beta_u + 2)^2 - a_u - \cfrac{q_u^2}{(\beta_u + 4)^2 - a_u - \cfrac{q_u^2}{(\beta_u + 6)^2 - a_u - \ldots}}} + \qquad \text{Equation 3}$$

-continued $$\cfrac{q_u}{(\beta_u - 2)^2 - a_u - \cfrac{q_u^2}{(\beta_u - 4)^2 - a_u - \cfrac{q_u^2}{(\beta_u - 6)^2 - a_u - \ldots}}}$$

The mass selective ion detection can be done in destructive or non-destructive ways. In the destructive way, the most common of which is mass selective instability scanning, RF amplitude is scanned up and ions are moved towards stability boundaries or resonance points, becoming instable. G. C. Stafford, P. E. Kelley, and D. R. Stephens, "Method of mass analyzing a sample by use of a quadrupole ion trap," vol. 4540884. United States: Finnigan Corporation, 1985. Once unstable, the ions are ejected sequentially according to mass-to-charge ratios of the ions. Other scan methods have been used by back scanning of the RF amplitude to a resonance point (G. C. Stafford, P. E. Kelley, and D. R. Stephens, "Method of mass analyzing a sample by use of a quadrupole ion trap," vol. 4540884. United States: Finnigan Corporation, 1985) or scanning RF frequency instead of RF amplitude. The ions ejected are detected using an ion detector such as an electron multiplier and microchannel plate. These ion detectors usually rely on particle multiplication, which is susceptible to an increase of pressure.

Non-destructive ion detection was also developed for ion trap mass analysis using image current detection. M. Soni, V. Frankevich, M. Nappi, R. E. Santini, J. W. Amy, and R. G. Cooks, "Broad-Band Fourier Transform Quadrupole Ion Trap Mass Spectrometry," *Anal. Chem.*, vol. 68, pp. 3314-3320, 1996; and D. E. Goeringer, R. I. Crutcher, and S. A. McLuckey, "Ion remeasurement in the radio frequency quadrupole ion trap," *Analytical Chemistry (Washington*; VOL. 67; ISSUE: 22; PBD: 15 Nov. 1995, pp. pp. 4164-4169; PL:, 1995. Image current detection is a technique that is similar to that used in an ion cyclotron resonance (ICR) instrument, in which a transit of image current induced by ion motions is recorded, and frequency components are subsequently derived by Fourier transform. Wide band detection to acquire secular frequencies of ions suffers from the high pressure of ion trap operation, and noise by RF and other electric signals.

There is a need for systems and methods that overcome the above deficiencies.

SUMMARY

An aspect of the invention provides a method for determining high order harmonic frequency components of ions including applying at least one continuous electrical excitation signal to at least one ion, detecting image current of the at least one ion, in which the image current is generated by motion of the at least one ion, and deriving high order harmonic frequency components of the at least one ion based on the image current of the at least one ion. The method can further include deriving a mass-to-charge ratio of the at least one ion based on the high order harmonic frequency components of the at least one ion. The method can further include applying a band pass filter to reduce thermal noise and improve signal-to-noise ratio.

In certain embodiments, the electrical excitation is by alternating current (AC). The electric excitation can be a single signal. Alternatively, the electrical excitation can be more than one signal. In certain embodiments, the mass-to-charge ratio of more than one ion is derived by apply more than one electrical excitation signal. In certain embodiments, the electrical excitation is applied at a signal such that only ions with strong high order field components are detected. In certain embodiments, the mass-to-charge ratio of more than one ion is sequentially derived by applying a single electrical excitation signal, and applying an RF signal of varying amplitude and/or frequency.

Another aspect of the invention provides a system for non-destructive ion mass-to-charge ratio detection including an ionizing source for converting molecules into gas phase ions, an ion trap configured for image current detection, and a continuous electrical excitation source connected to the ion trap. The system can further include a transformer and a switch, in which the transformer is configured to reject an RF signal, in which the switch is closed during a period of ion detection. The system can further include at least one amplification circuit, a band pass filter, and a computer operably connected to the system.

The ion trap can be configured such that an image current signal from the ions is detected by an electrode, in which the electrode also applies a continuous electrical excitation signal. In other embodiments, the ion trap is configured such that an image current signal from the ions is detected by a first electrode and a continuous electrical excitation signal is applied by a second electrode. Exemplary ion traps include a quadrupole ion trap, a cylindrical ion trap, and a rectilinear ion trap.

BRIEF DESCRIPTION OF THE DRAWINGS

FIG. 4 shows an equation for calculating ion motion in the z direction.

DETAILED DESCRIPTION

Figure 1:
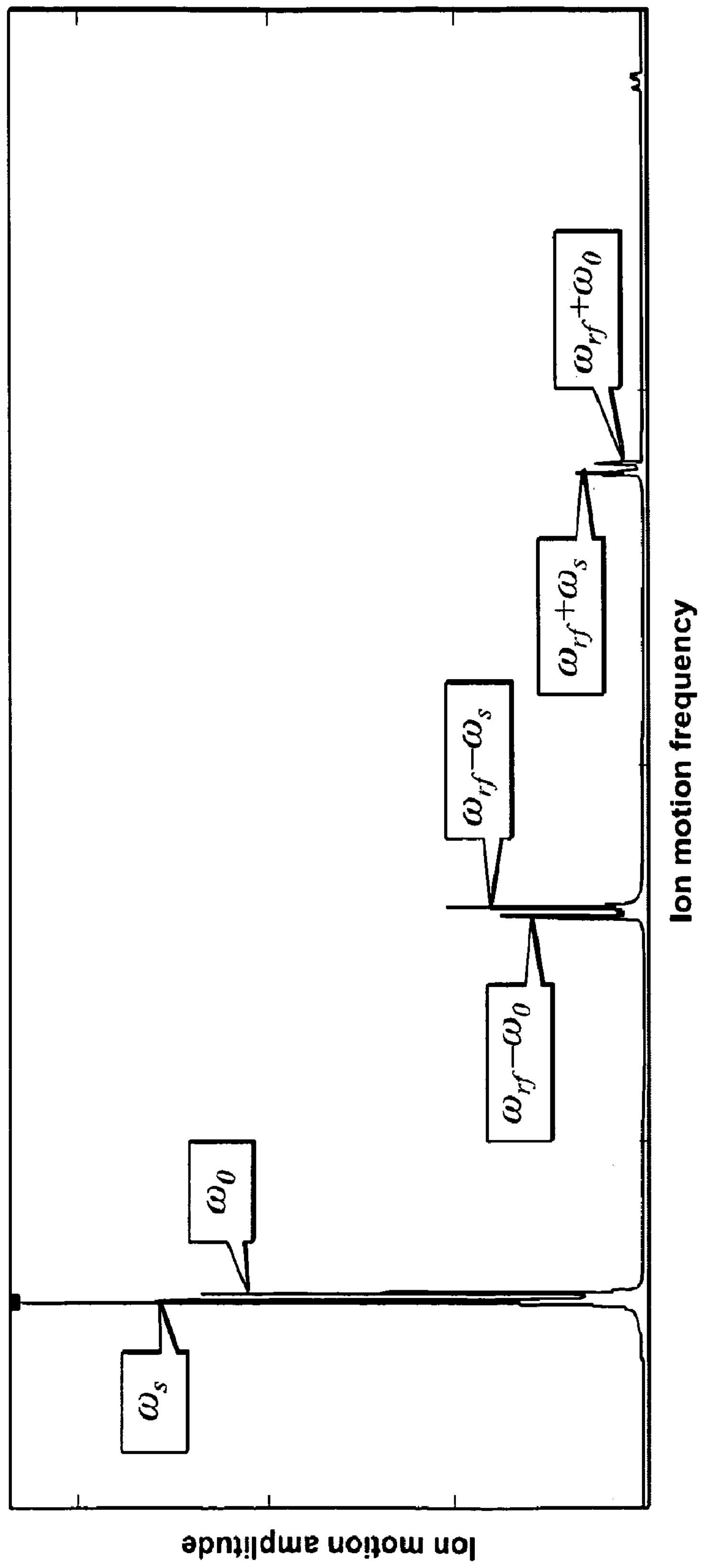
FIG. 1 is a frequency spectrum showing ions motion corresponding to high order harmonic frequencies.

Aspects of the invention herein generally relate to methods and devices for non-destructive ion mass-to-charge ratio (m/z) detection using image current detection with presence of electrical excitation, e.g., alternating current (AC). In certain embodiments, these systems and methods can be applied at high pressure (>$10^{-4}$ Torr). In certain embodiments, high order harmonic ion image currents are applied to measure ion mass-to-charge ratios. Another aspect of the invention generally relates to a detection circuit that allows for non-destructive ion mass-to-charge ratio detection using image current detection with presence of electrical excitation, e.g., alternating current (AC). In certain embodiments, a band pass filter is used to limit thermal noise of the system and improve the signal noise ratio of the system. Implementation of the systems and methods of the invention allows for use of smaller mass spectrometer systems.

In the non-destructive ion detection described here, the ion motion corresponding to high order harmonic frequencies (such as $\omega_{rf}-\omega_s$ and $\omega_{rf}+\omega_s$), instead of the secular frequency ($\omega_s$, when n=0), is detected using image current detection with a constant excitation applied to the waveform signal. The ion motion inside a RF ion trap has a complex frequency spectrum with the presence of an applied alternating current (AC) signal as shown in Equation 1, and FIG. 1. Some high order frequency components in the spectrum are unique for ions with particular mass charge ratios (like $\omega_s$, $\omega_{rf}-\omega_s$, $\omega_{rf}+\omega_s$ etc.), and they can be correlated to the mass to charge ratios of these ions at a set of experimental conditions.

One embodiment is to apply an AC with frequency $\omega_0$ at or close to the secular frequency $\omega_s$ of an ion while monitoring the $\omega_{rf}-\omega_s$ or $\omega_{rf}+\omega_s$. Since the high order frequency components used for detection are different and far away from the applied AC signal frequency, band pass filters can be used to select these frequency components even in the presence of a much higher amplitude AC signal. This allows for methods of the invention to be applied at high pressure in an ion trap, where the trajectories of the ions are damped quickly without continuous AC excitation. High pressure ion detection allows for the minimization of the size of the pumping system. The bandwidth of this band pass filter can be used to both limit the system thermal noise and improve the system signal-to-noise ratio.

In other embodiments, the invention herein allows for generating ion motion image currents that carry only the characteristic frequency components of the trapped ions in ion traps with strong high order field components. In other embodiments, the image current detection with the excitation waveform signal, and the induced image current signal are separated by detecting the image current on electrodes other than those to which the AC signal is applied. These embodiment help minimize the system noise.

In other embodiments, the invention generally relates to a method of using multiple AC signals and narrow band filters to simultaneously detect ions of multiple m/z values. In other embodiments, the invention generally relates to a method of sequential detection of ions of multiple m/z values by using single AC and single narrow band filter, and varying the amplitude and/or frequencies of the trapping RF. In other embodiments, the invention generally relates to a method of minimizing pressure induced coalescence and other space charge problems by applying a waveform of wide frequency range and low amplitude. In other embodiments, the invention generally relates to a method of applying a low amplitude signal of specific (scanning) frequency to prepare the ions for ejection by exciting them (warming them) before the actual mass selective instability scan used for destructive ion detection at high pressure.

Figure 2:
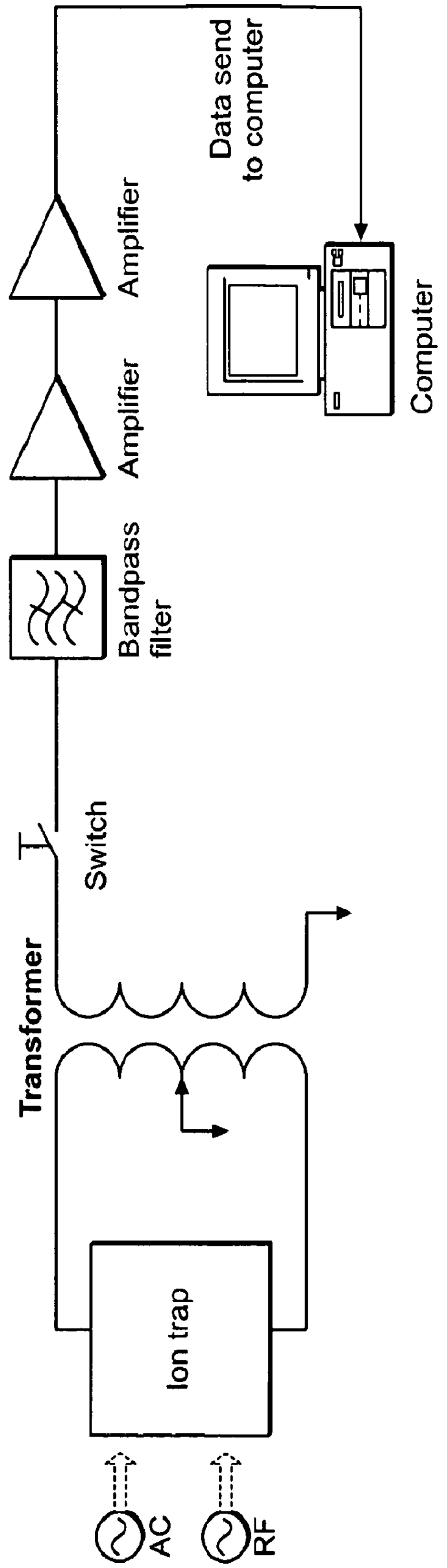
FIG. 2 is a drawing showing components of the systems of the invention.

Additional circuits, including a transformer, a switch and multistage amplification circuits can be designed as shown in FIG. 2. The transformer is designed to reject the common mode signal from the RF signal source. The switch will be on at the time of detection and off at other times to avoid saturation of the amplifier. The ion trap in FIG. 2 can be a quadrupole ion trap (QIT), cylindrical ion trap (CIT), rectilinear ion trap (RIT) or any other 2D or 3D ion trap. For ion traps with strong high order fields (like the CIT and RIT), excitation of ion motion in one direction will also induce ion motion in other directions.

Figure 3:
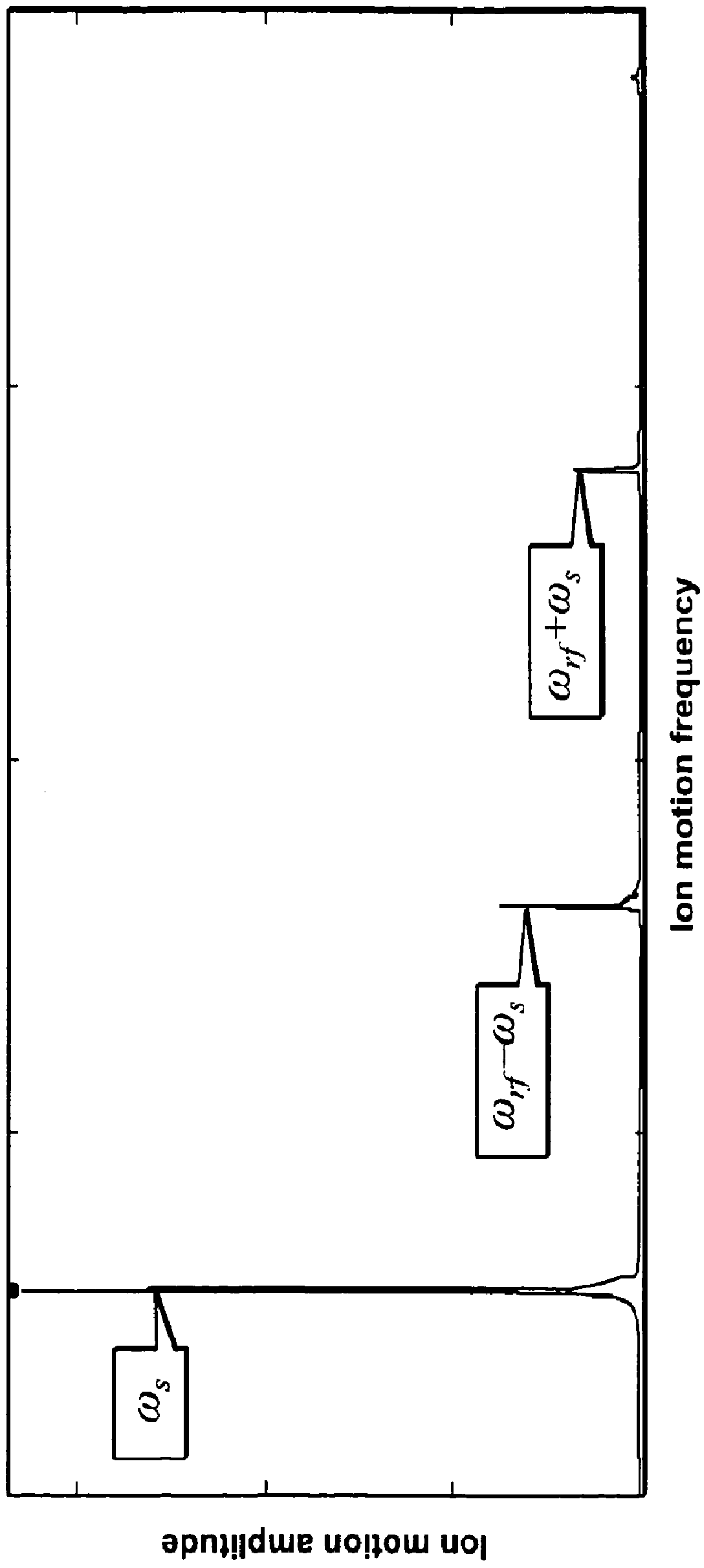
FIG. 3 is a frequency spectrum showing only secular motion frequency components of ion motion.

The frequency spectrum of ion motion in the other directions is shown in FIG. 3. Different from the ion motion in the excitation direction as shown in FIG. 1, ion motion in FIG. 3 only has the secular motion frequency components. These components are the characteristic frequency components ($\omega_s$, $\omega_{rf}-\omega_s$, $\omega_{rf}+\omega_s$ etc.), any of which can be used to detect ion mass charge ratio. Without the AC frequency component ($\omega_0$) and its high order harmonic components ($\omega_{rf}-\omega_0$, $\omega_{rf}+\omega_0$ etc.), the ion motion image current characteristic frequency components are therefore much easier to detect. Also, with the excitation waveform applied on one set of electrodes, the image current detection can be performed on another set of electrodes. In this way, the excitation waveform signal and the induced image current signal are isolated by the capacitance of the ion trap. The system noise can be further reduced by this method.

The detection of ions of multiple m/z values can be done by the following exemplary ways: applying waveform containing multiple AC frequencies and using multiple narrow band filters to simultaneously monitor corresponding ion motions at high order frequencies; or using a single AC signal and a single narrow band filter while sequentially changing the secular frequencies of the ions into the stimulating frequency by changing the amplitude or the frequency of the trapping RF.

Those skilled in the art will recognize or be able to ascertain using no more than routine experimentation, numerous equivalents to the specific systems and processes described herein. Such equivalents are within the scope of the present invention and claims. The contents of all references, including issued patents and published patent applications cited throughout this application, are hereby incorporated by reference herein in their entirety.

What is claimed:

1. A method for determining high order harmonic frequency components of ions, the method comprising:

applying at least one continuous alternating current (AC) electrical excitation signal to at least one ion;

detecting image current of the at least one ion, wherein the image current is generated by motion of the at least one ion; and deriving high order harmonic frequency components of the at least one ion based on the image current of the at least one ion.

2. The method according to claim 1, further comprising deriving a mass-to-charge ratio of the at least one ion based on the high order harmonic frequency components of the at least one ion.

3. The method according to claim 1, wherein the electric excitation is a single signal.

4. The method according to claim 1, wherein the electrical excitation is more than one signal.

5. The method according to claim 4, wherein the mass-to-charge ratio of more than one ion is derived by apply more than one electrical excitation signal.

6. The method according to claim 1, further comprising applying a band pass filter to reduce thermal noise and improve signal-to-noise ratio.

7. The method according to claim 1, wherein the electrical excitation is applied at a signal such that only ions with strong high order field components are detected.

8. The method according to claim 1, wherein the mass-to-charge ratio of more than one ion is sequentially derived by applying a single electrical excitation signal, and applying an RF signal of varying amplitude and/or frequency.

9. A system for non-destructive ion mass-to-charge ratio detection, the system comprising: an ionizing source for converting molecules into gas phase ions; an ion trap configured for image current detection; and a continuous alternating current (AC) electrical excitation source connected to the ion trap.

10. The system according to claim 9, wherein the ion trap is configured such that an image current signal from the ions is detected by an electrode, and the electrode is also applying a continuous alternating current (AC) electrical excitation signal.

11. The system according to claim 9, wherein the ion trap is configured such that an image current signal from the ions is detected by a first electrode and a continuous alternating current (AC) electrical excitation signal is applied by a second electrode.

12. The system according to claim 9, further including a transformer and a switch, wherein the transformer is configured to reject an RF signal, and the switch is closed during a period of ion detection.

13. The system according to claim 9, further including at least one amplification circuit.

14. The system according to claim 9, wherein the ion trap is selected from the group consisting of: a quadrupole ion trap, a cylindrical ion trap, and a rectilinear ion trap.

15. The system according to claim 9, further comprising a band pass filter.

16. The system according to claim 9, further comprising a computer operably connected to the system.

* * * * *